Oct. 4, 1938.  L. W. THOMPSON  2,132,278
ELECTRICAL CONTROL CIRCUIT
Filed Dec. 1, 1936
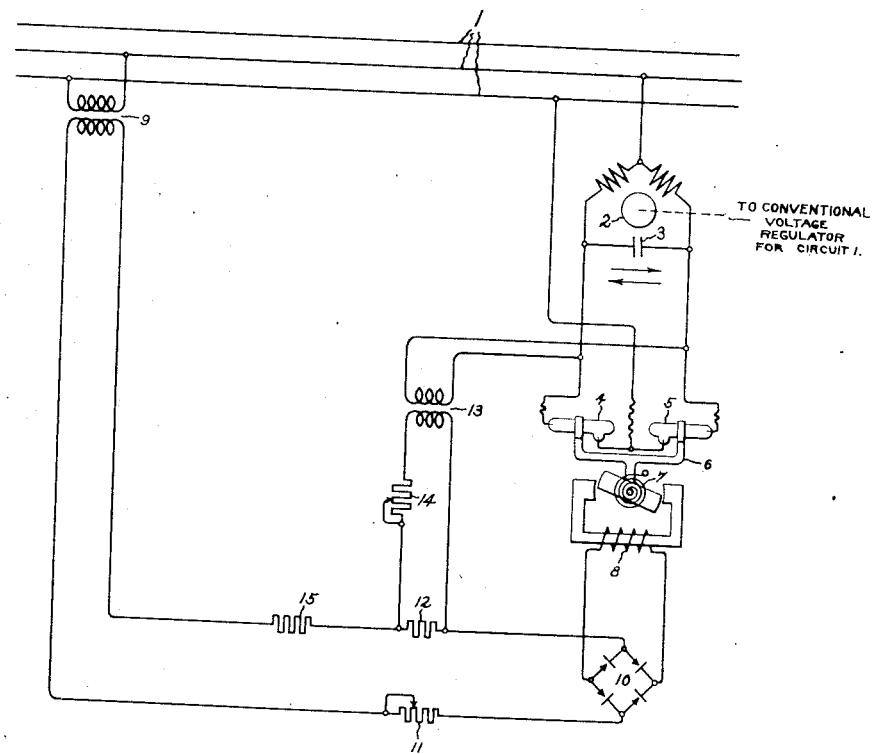
Inventor:
Louis W. Thompson,
by Harry E Dunham
His Attorney.

Patented Oct. 4, 1938

2,132,278

UNITED STATES PATENT OFFICE 2,132,278

ELECTRICAL CONTROL CIRCUIT

Louis W. Thompson, Schenectady, N. Y., assignor to General Electric Company, a corporation of New York Application December 1, 1936, Serial No. 113,660

7 Claims. (Cl. 172—233)

My invention relates to electrical control circuits and more particularly to improved compensating or anti-hunting control circuits for automatic electrical regulators.

Many automatic electrical regulators are of the motor operated type in which the motor is a reversible split-phase motor. When such a motor reverses, the voltage across the phase splitting element reverses and in accordance with my invention, I utilize this reversible voltage for applying a suitable reversible bias to the circuit controlling means for the motor. This bias may be used to produce an anti-hunting effect or, in cases where the motor control device tends to become unbalanced when it is not in its neutral position, as for example when the control device operates mercury switches in which the center of gravity of the mercury shifts, the reversible bias can be used to correct for this unbalancing effect.

An object of my invention is to provide a new and improved electrical control circuit.

Another object of my invention is to provide a novel compensating, or anti-hunting, biasing circuit for electrical regulators.

My invention will be better understood from the following description taken in connection with the accompanying drawing, and its scope will be pointed out in the appended claims.

The single figure of the accompanying drawing illustrates diagrammatically an embodiment of my invention as applied to the control circuit for an automatic voltage regulating system for an alternating current circuit.

The actual voltage regulator for circuit 1 may be of any conventional motor operated type (not shown), the driving motor for which is shown as a reversible capacitor motor 2, the phase-splitting capacitor of which is shown at 3. Mercury switches 4 and 5 are arranged to control selectively reversible operating connections between the motor 2 and the circuit 1. Switches 4 and 5 are carried by a pivotally mounted member 6 biased in a clockwise direction by means of a spring 7 and biased in a counter-clockwise direction by means of an electromagnet 8. The electromagnet is connected to be responsive to the voltage of the circuit 1 by means of a potential transformer 9 and a rectifier 10. The rectifier 10 eliminates vibration and hum in the electro-responsive control device made up of the magnet 8 and the switches 4 and 5. An adjustable series resistor 11 is provided for controlling the voltage setting of the electromagnet 8. A second resistance 12 is connected in series with the energizing circuit of the magnet 8 and this resistance is connected across the capacitor 3 by means of any suitable circuit which is shown by way of example as including an insulating transformer 13 and an adjustable series resistor 14.

A current limiting resistor 15 is also connected in series with the electromagnet 8.

In the operation of the illustrated embodiment of my invention, the resistance 11 is so adjusted that at the desired normal voltage on circuit 1, the counter-clockwise electromagnetic torque on the member 6 is just balanced by the clockwise torque of the spring 7 when the member 6, carrying the mercury switches 4 and 5, is in a neutral or balanced mid-position wherein both switches 4 and 5 are open. Under these circumstances, the motor 2 is deenergized and no voltage appears across the capacitor 3. If now the voltage of circuit 1 departs from normal, the balance of forces on the member 6 is destroyed and as this member 6 tilts in one or the other direction, one or the other of the mercury switches 4 and 5 will close thereby starting the motor 2 which will operate the regulating means so as to restore the voltage to normal.

Due to the tilting action of the member 6, the mercury in the switches 4 and 5 changes its position relative to the member 6 thereby changing the setting of the regulating system so as ordinarily to require an over- or under-shooting of the regulated voltage before the electro-responsive device will again become balanced. However, by means of the resistor 12 connected across the capacitor 3, this unbalancing is compensated for. By means of the adjustable resistance 14, the voltage applied across the resistance 12 may be adjusted to have a magnitude such as to produce an electrical bias in the energizing circuit of the electromagnet 8 which compensates for the unbalancing mechanical bias produced by the mercury shift.

As the electro-responsive control device goes from its "raise" to its "lower" position, or vice versa, the voltage across the capacitor 3 will reverse thereby reversing the biasing effect in the energizing circuit of the electro-responsive device so that for both directions of operation the direction of the biasing effect will be correct.

While I have shown and described a particular embodiment of my invention, it will be obvious to those skilled in the art that changes and modifications may be made in my invention and I therefore aim in the appended claims to cover all such changes and modifications as fall within the true spirit and scope of my invention.

What I claim as new and desire to secure by Letters Patent of the United States, is:

1. In an automatic regulating system, an electro-responsive control device having regulator raise and lower circuit controlling positions on opposite sides of a neutral balanced position, said device including means which unbalances it when it is in said raise and lower positions, and normally deenergized electrical means for compensating for said unbalance, said electrical means being energized to produce opposite biasing effects on said device in accordance with whichever of said circuit controlling positions it is in.

2. In an automatic regulating system, an electro-responsive control device having regulator raise and lower circuit controlling positions on opposite sides of a neutral position, said device including mercury switching means having displaceable masses of mercury which unbalances it when it is in said raise and normally deenergized lower positions, and electrical means for compensating for said unbalance, said electrical means being energized to produce opposite biasing effects on said device in accordance with whichever of said circuit controlling positions it is in.

3. In a combination, an alternating current supply circuit, a reversible split phase motor, a phase splitting element therefor, circuit controlling means having separate positions on opposite sides of a neutral position for making such reversing connections between said motor and said circuit as to reverse the voltage of said element, and means for biasing said controlling means away from said separate positions in accordance with the voltage across the phase splitting element of said motor.

4. In a regulating system, a reversible capacitor motor, an electro-responsive control device for controlling the direction of operation of said motor, and connections for using the reversal in voltage across the capacitor of said motor when the direction of operation of said motor reverses for applying a reversible bias to said electro-responsive control device.

5. In a regulating system, a reversible capacitor motor, an electro-responsive control device for controlling the direction of operation of said motor, and connections for using the reversal in voltage across the capacitor of said motor when the direction of operation of said motor reverses for applying a reversible bias to said electro-responsive control device, said bias being in such a direction as to tend to cause said control device to de-energize said motor.

6. In an automatic regulating system, an alternating current circuit, a reversible capacitor motor for operating a regulator for said circuit, mercury switching means for controlling reversing connections between said motor and said circuit, electromagnetic means responsive to a condition of said circuit to be regulated for operating said mercury switching means, and connections between the capacitor of said motor and said electromagnetic means for applying a bias to said means which reverses in accordance with the direction of operation of said motor.

7. In an automatic voltage regulating system, an alternating current circuit, a reversible capacitor motor for operating a voltage regulator for said circuit, a pair of mercury switches for selectively controlling reversing operating connections between said motor and said circuit, electromagnetic means responsive to the voltage of said circuit for operating said mercury switches, an impedance in series with said electromagnetic means, and means for connecting the capacitor of said motor across said impedance so as to produce a reversible biasing voltage in the energizing circuit of said electromagnetic means, said biasing voltage being in such a direction as to tend to cause said electromagnetic means to open whichever mercury switch is closed.

LOUIS W. THOMPSON.